E. SCHNEIDER.
HYDRAULIC JOINT PACKING.
APPLICATION FILED MAR. 31, 1919.
1,331,216.
Patented Feb. 17, 1920.
5 SHEETS—SHEET 1.
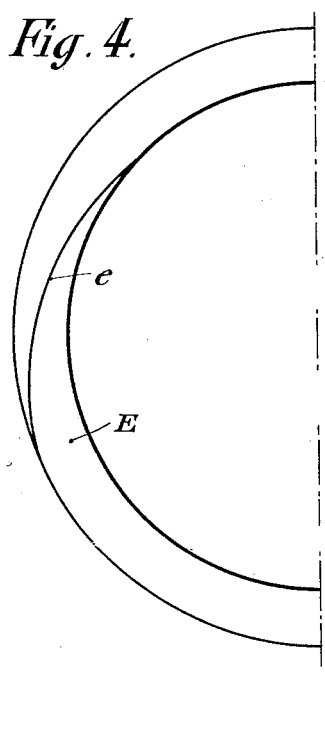
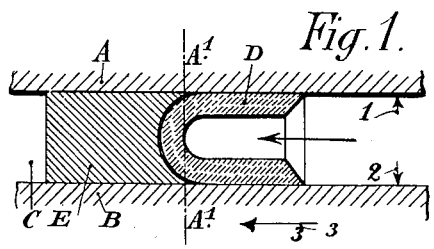
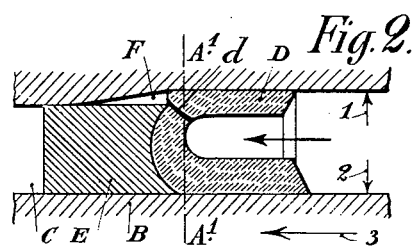
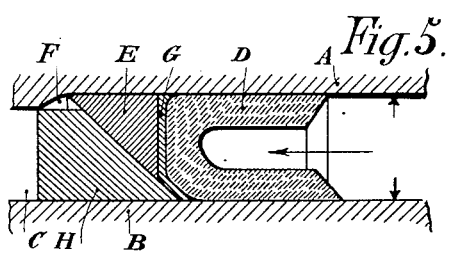

E. SCHNEIDER.
HYDRAULIC JOINT PACKING.
APPLICATION FILED MAR. 31, 1919.

1,331,216.

Patented Feb. 17, 1920.
5 SHEETS—SHEET 2.

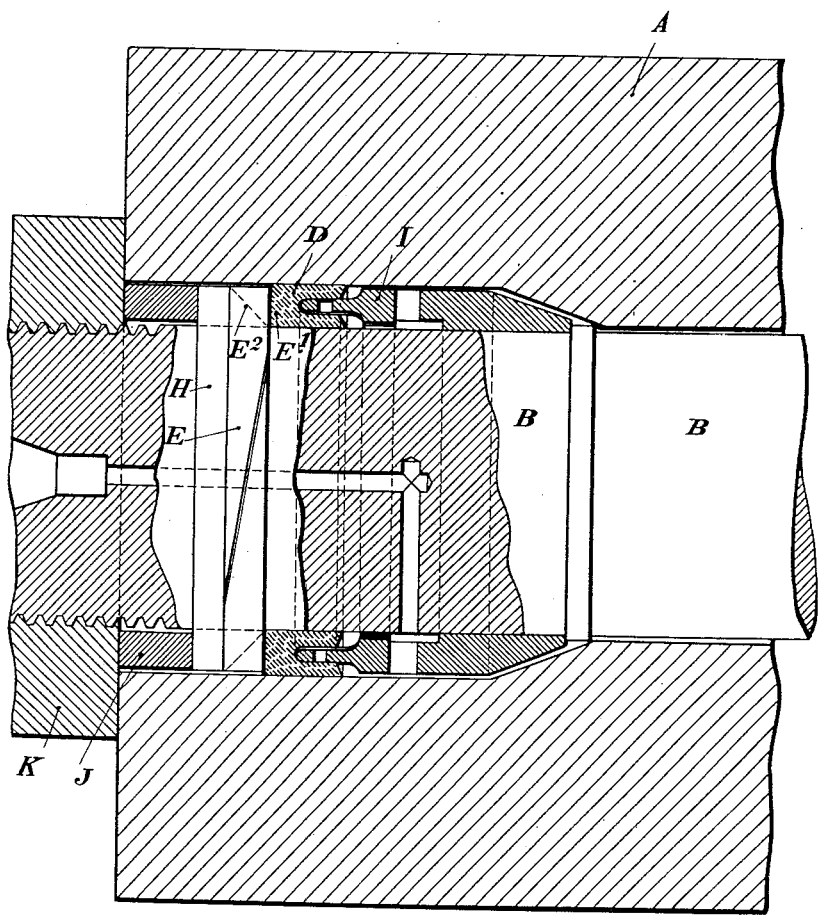

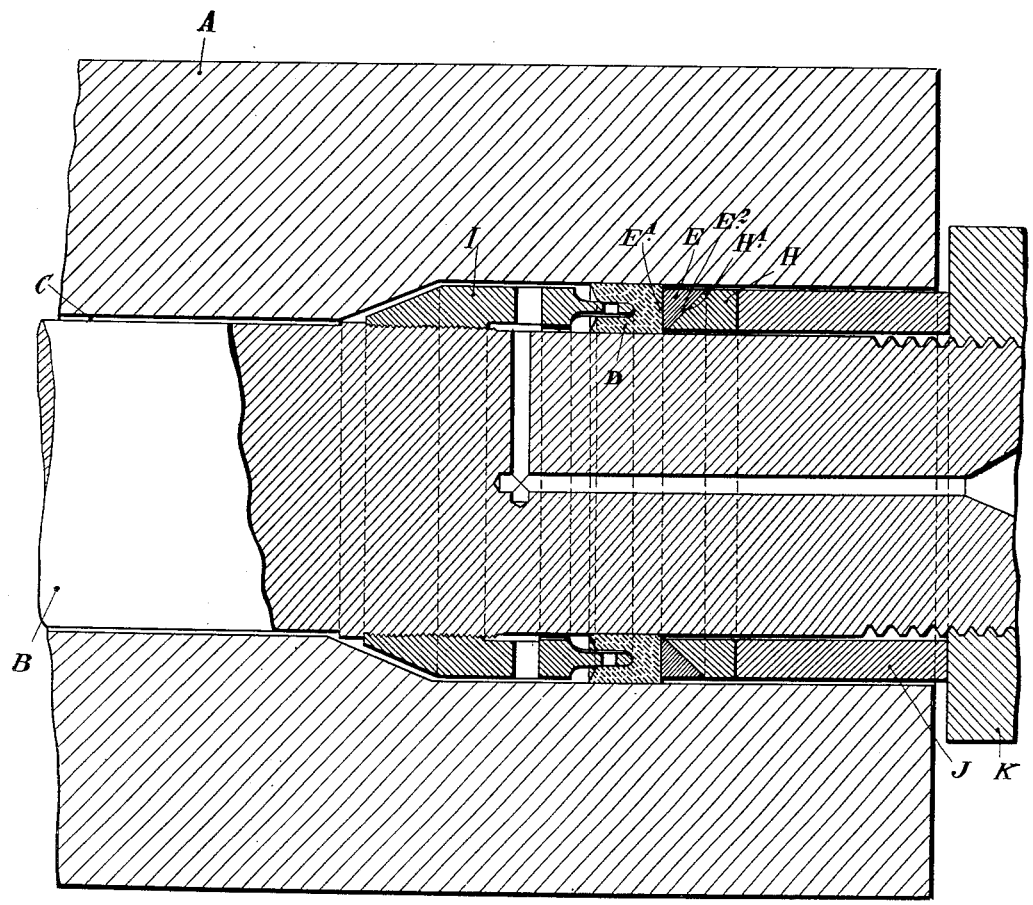

E. SCHNEIDER.
HYDRAULIC JOINT PACKING.
APPLICATION FILED MAR. 31, 1919.
1,331,216.
Patented Feb. 17, 1920.
5 SHEETS—SHEET 5.
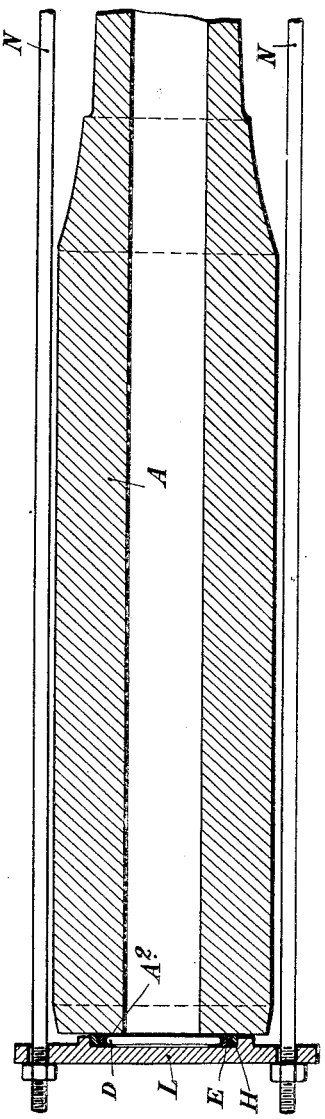
Fig.10.
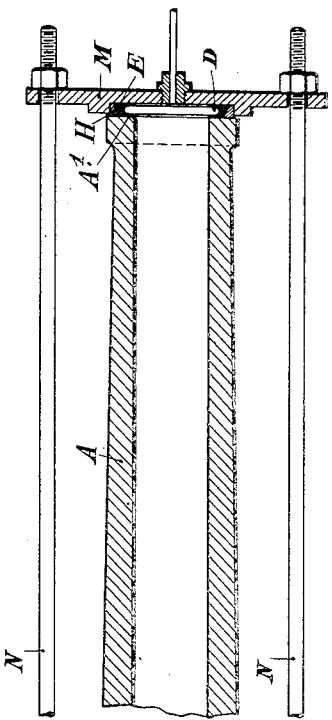
Fig.10.ᵃ

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

HYDRAULIC-JOINT PACKING.

1,331,216.           Specification of Letters Patent.         Patented Feb. 17, 1920.

Application filed March 31, 1919. Serial No. 286,488.

*To all whom it may concern:*

Be it known that I, EUGÈNE SCHNEIDER, a citizen of the French Republic, and a resident of Paris, France, have invented a new and useful Improved Hydraulic-Joint Packing, which invention is fully set forth in the following specification.

This invention has for its object to provide an improved hydraulic joint packing which is more particularly applicable to the joints required by the known so-called "self-hooping" process for the manufacture of tubes of great strength made in one piece without the use of hoops. In that process the joints are situated between a cylindrical bar or core and the tube to be manufactured, and hydraulic pressure is produced between the said bar and the said tube which latter is deformed or formed by stressing the metal beyond its elastic limit while the tube is brought approximately to its desired final dimensions.

In making the requisite joint for such operations it would not be feasible to employ a simple metal cup packing member which would be efficient only if the requisite very high pressure were applied suddenly.

Since, on the contrary the pressure must be increased gradually it is absolutely necessary that the joint packing shall be very supple. For this purpose use has been made hitherto, of a cup packing member composed of a very plastic material such as leather or a special hard rubber that receives the pressure directly and bears on a ring or against a metal cup packing member that partly envelops it.

In order that the invention may be more readily understood, reference is had to the accompanying drawings, in which—

Figures 1 and 2 are cross-sectional views of a known packing showing its condition before and after application of pressure;

Fig. 4 shows in front elevation the half-end view of ring E;

Fig. 5 is a cross-sectional view of the improved joint packing showing its deformation by hydraulic pressure;

Figure 8:
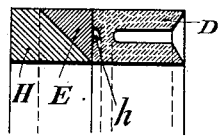
Figs. 6, 7 and 8 are cross-sectional views showing other constructional forms of my invention.

Figs. 9, 9ª are longitudinal sectional views showing the application of the invention to apparatus used in the process of "self-hooping" a metal tube; and Figs. 10, 10ª show, in longitudinal section, views of the hydraulic joint at the ends of a gun tube in course of manufacture.

In Fig. 1 A is the inner wall of the tube to be formed or "self-hooped"; B is the outer surface of the bar or core; C is the annular space in which the hydraulic pressure is applied; D is a cup packing member of leather or other plastic material such as special hard rubber; and E is a metal ring serving as an external support for the cup packing member.

This known joint packing has a serious drawback. The cup packing member D of plastic material tears very quickly, which fact may be explained as follows:—

As the pressure increases, the tube A becomes deformed by expansion in the radial direction (arrow 1), while the core B on the contrary contracts radially (arrow 2) and expands longitudinally (arrow 3). The cup packing member must obey all these movements. But since the radial hydraulic pressure can act upon the tube A only up to near the cross section $A^1$—$A^1$, the deformation of the tube A beyond this cross section results in the formation of a pocket F such as the one indicated in Fig. 2, which is not filled by the rigid ring E.

As the cup packing member D ceases to find a support at this pocket, while the portion of the said packing member that is in contact with the core is also pulled longitudinally in the direction of the arrow 3, it will be understood that the unsupported portion of the packing member D will promptly tear at $d$ as indicated in Fig. 2.

The present invention obviates that drawback completely, and it consists essentially in providing the plastic cup packing member D with a metal support capable of expanding radially in such a manner as to assure the continuity of the said support, notwithstanding the formation of the pocket F. This result is obtained by the use of a supporting ring which is split so as to allow of its expansion and which has an external bevel that enables the said ring in expanding, to slide over a corresponding bevel of a second ring serving as a counter-support; this second ring may be continuous or it may be split. On the other hand, any liability of the cup packing member tearing as a result of its becoming deformed, when it tends to remain applied both to the extensible supporting ring and the longitudinally expanding core, is avoided by providing on the outer surface of the plastic cup packing member a covering of a ductile metal such as for instance copper or brass. This covering by taking a part of the friction between the plastic cup packing member and the surfaces (core B, tube A to be manufactured, and supporting rings) in contact with it, facilitates the sliding motion of the entire joint, while protecting the cup packing member from any tearing that might tend to occur in the case of a direct contact happening between the plastic material and the sharp edges of its supporting rings.

Figure 3:
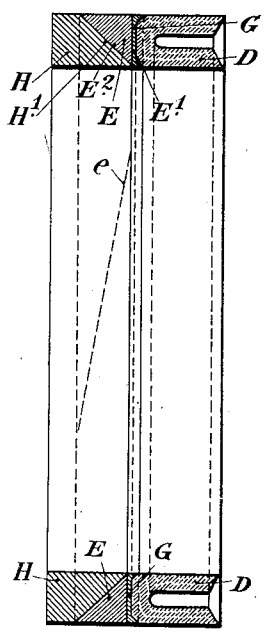
Fig. 3 is a cross-sectional view showing one constructional form of my invention.

In the example shown in Fig. 3 the improved joint packing comprises a cup packing member D of plastic material covered with an annular covering or crown G of copper, by means of which it bears against a metal ring E having a long sloping split $e$ shown in front elevation in the half end view of the ring E (Fig. 4). The supporting surface $E^1$ of the split ring E bearing against the cup packing member D is flat or concave according to the sectional shape of the said packing member to which it conforms exactly. The opposite face $E^2$ is beveled; it bears with this rear bevel against a corresponding bevel $H^1$ of a metal counter-ring H which latter may be continuous or split.

In Fig. 5 is shown the improved joint packing as deformed by the hydraulic pressure acting in the annular space C between the core B and the tube A to be manufactured.

When there is a tendency for a pocket F to be formed, the split ring E, which is extensible, opens in order to follow the deformation due to the expansion of the tube A and the contraction of the core B. The beveled face $E^2$ slides over the beveled face $H^1$ of the counter-ring H, and the support for the cup packing member D is thus maintained without any break in its continuity. In these movements of deformation of the plastic cup packing member D, any tearing of the latter by contact with the sharp edges of the split ring E and counter-ring H is prevented by the arrangement of the copper covering or crown G.

As above stated the packing member D may be made of leather, in which case its face bearing against the ring, should be semi-circular.

When a cup packing member of hard rubber is used, it may have a flat bearing face.

Figure 6:
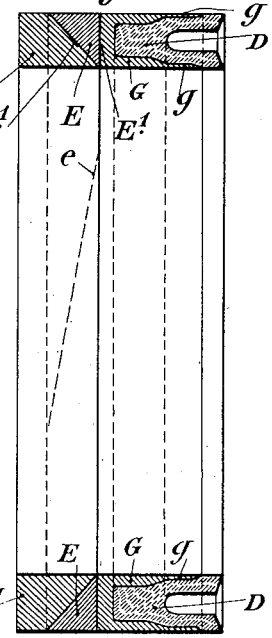

The cup covering G of ductile metal, may, as shown in the modification illustrated in Fig. 6, have thinned edges extending up to near the ends of the lips of the plastic cup packing member D.

Figure 7:
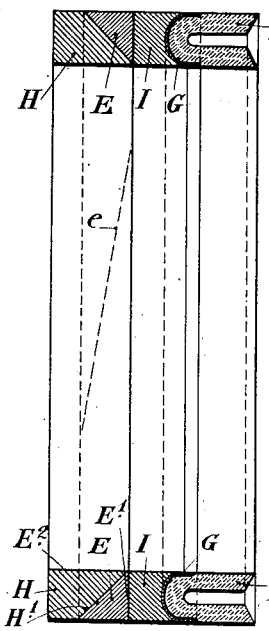

As shown in Fig. 7 the plastic member of the improved joint packing may comprise a continuous ring of hard rubber or other material capable of being easily shaped, interposed between a cup leather D and the split supporting ring E.

When a cup packing member of hard rubber is used, its transverse elasticity may be increased by forming a groove $h$ in its supporting face as shown in Fig. 8.

Figs. 9 and $9^a$ illustrate in longitudinal section a constructional example of the improved hydraulic joint packing in its application to apparatus used in the process of "self-hooping" a metal tube of great strength such as a gun barrel tube.

Figs. 10 and $10^a$ illustrate the hydraulic joints provided at the ends of the gun tube A to be manufactured, at the breech and muzzle ends respectively.

I is a forcing ring for pressing in the usual way the cup packing member D against its support which latter is constituted according to this invention, by the combination of a split ring E having a beveled rear face, and a counter-ring H having a corresponding front bevel $H^1$.

J is a press ring interposed between the improved packing, and the nut K.

As shown diagrammatically in Fig. 10 and Fig. $10^a$ the improved joint packing may be arranged between the front end $A^1$ and the rear end $A^2$ of the tube A to be "self-hooped" and supporting plates L, M which are connected to each other by tie-rods N; the pressure being applied by means of a body of liquid filling the whole of the tube.

What I claim is:—

1. A hydraulic joint packing characterized by the combination of a plastic cup packing member of leather, hard rubber or other plastic material, with an annular metal supporting member composed of a split beveled ring contacting the said cup packing member and bearing against a continuous or split counter-ring having a corresponding bevel.

2. A hydraulic joint packing as claimed in claim 1, wherein the plastic cup packing member has its face that is adapted to bear against the split metal ring, covered with a covering of copper, brass or other ductile metal which may extend up to near the ends of the lips of the plastic cup packing member.

3. A hydraulic joint packing comprising a plastic cup packing member having a facing of ductile metal, supporting means for said cup member comprising two metal annular members having contacting bevel surfaces to permit radial displacement of one member over the other, and a ring of hard rubber, or the like, interposed between said cup member and reinforcing means.

4. A hydraulic joint packing, comprising a plastic cup packing member provided with a groove in its bearing face to facilitate radial deformation, and supporting means for said cup member comprising two metal annular members having contacting bevel surfaces to permit radial displacement of one member over the other.

In testimony whereof I have signed this specification.

EUGÈNE SCHNEIDER.